United States Patent Office 3,440,302
Patented Apr. 22, 1969

---

3,440,302
ROOM TEMPERATURE CURABLE COPOLYMERS OF UNSATURATED ORGANIC POLYMERS AND MERCAPTOSILANES
John L. Speier and Joseph W. Keil, Midland, and William G. Gowdy, Freeland, Mich., assignors to Dow Corning Corporation, Midland, Mich., a corporation of Michigan
No Drawing. Continuation-in-part of application Ser. No. 420,090, Dec. 21, 1964. This application Mar. 22, 1965, Ser. No. 441,842
Int. Cl. C08d *9/00;* C09k *3/10*
U.S. Cl. 260—825    8 Claims

ABSTRACT OF THE DISCLOSURE

Room temperature, air curable, solvent-resistant sealant composition consisting essentially of copolymers of unsaturated organic polymers and mercaptosilanes.

An illustrative example: to 20 weight percent solution of polybutadiene of sufficient molecular weight to be vulcanizable to a rubber, dissolved in xylene, is added 0.02 g. of

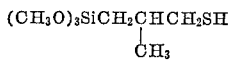

and heated at 100° C. for 24 hours to form a copolymer. As a crosslinking agent 0.163 g. of $CH_3Si(OCH_3)_3$ is added; as a condensation catalyst 0.082 g. of titanium acetonyl acetate is added. The gum is easily workable and when allowed to stand in the air cures to rubbery, insoluble material.

---

This application relates to organic polymers that spontaneously cure to resinous or rubbery materials upon contact with the atmosphere, and is a continuation-in-part of patent application 420,090, filed Dec. 21, 1964, and now abandoned.

Room temperature vulcanizing silicone sealants are commercially sold for a wide variety of sealing uses. Such materials are, however, expensive, and there still remains a need for an inexpensive material that spontaneously cures in the air to a rubber or resin, and which does not readily dissolve in solvents, indicating that it is chemically cross-linked between the molecules. Most presently-known, inexpensive sealants have little solvent resistance, since their dried forms are not chemically cross-linked.

The compositions of this invention fulfill this need, curing spontaneously in the air to solvent-resistant, infusible rubbers and resins.

This application relates to a room temperature curable copolymer of (a) 100 parts by weight of an essentially uncrosslinked organic polymer, wherein at least one mol percent of the polymer units contained in the organic polymer possess aliphatic unsaturation, and (b), from 0.6 to 20 parts by weight of a silane of the formula $$HSRSiX_y$$
$$R'_{(3-y)}$$

where R is a divalent hydrocarbon radical free of aliphatic unsaturation, X is selected from the group consisting of hydroxyl and hydrolyzable groups, R' is a monovalent hydrocarbon radical, free of aliphatic unsaturation, of no more than six carbon atoms, and y has a value of 1 to 3.

It is preferred for (a) to contain at least 3 mol percent of unsaturated polymer units.

R can be any divalent hydrocarbon radical free of aliphatic unsaturation: e.g. alkylene and cycloalkylene radicals such as methylene, trimethylene, $$-CH_2CH(CH_2)_3CH_2-$$
$$CH_3$$

octadecamethylene, and

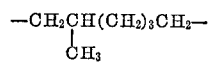

and aryl-containing radicals such as

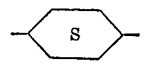

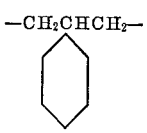

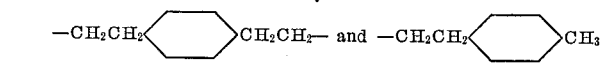

X can be the hydroxyl group or any hydrolyzable group e.g.: alkoxy radicals such as methoxy, ethoxy, or butoxy; alkoxyalkoxy radicals such as ethoxymethoxy, methoxymethoxy, or methoxyethoxy; acyloxy groups such as acetoxy or butyroxy; halogen groups such as chloride or bromide; alkyl-substituted isocyanoxy radicals such as

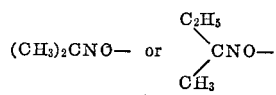

or the isocyanate group.

R' can be any monovalent hydrocarbon radical, free of aliphatic unsaturation, of no more than 6 carbon atoms such as the methyl, ethyl, isohexyl, cyclopentyl, or phenyl groups.

Any organic polymer of the above description is suitable for use in this application.

The organic rubbers are operative as ingredient (a). Examples of these are natural latex, polybutadiene, styrene-butadiene rubber, ethylacrylate-butadiene rubber, butadiene-acrylonitrile rubber, butyl rubber, ethylene-propylene-cyclohexadiene rubber, and chloroprene rubber, all of which contain at least one mol percent of aliphatically unsaturated polymer units.

Thermoplastic resin-forming materials which contain sufficient aliphatic unsaturation are also suitable for use in this invention; e.g. vinylic-polymerized materials such as poly(styrene-butadiene-acrylonitrile), or poly(methylmethacrylate-butadiene); alkyds such as copolymers of maleic anhydride and ethylene glycol, of terephthalic acid and hydroquinone, of cyclohexene dicarboxylic acid, terephthalic acid and propylene glycol; and of partially polymerized drying oil acids such as soybean, linseed, tung, or castor oil acids and 1,6-hexanediol; polyamides such as copolymers of glutaconic acid, adipic acid, and ethylene diamine, of fumaric acid, sebacic acid, and octamethylene diamine, of p-phenylene diacetic acid and 1,4-diaminebutene-2, of poly(histidine) and glycine, and homopolymers of $H_2NCH_2CH=CHCH_2COOH$; and other polymers containing unsaturation such as coumarone-indene resins, terpene resins, and cellulose acrylate.

Also suitable for use in this invention are the fluid organopolysiloxane polymers and copolymers that contain aliphatic unsaturation: e.g.

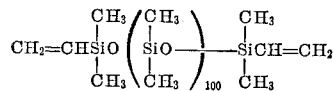

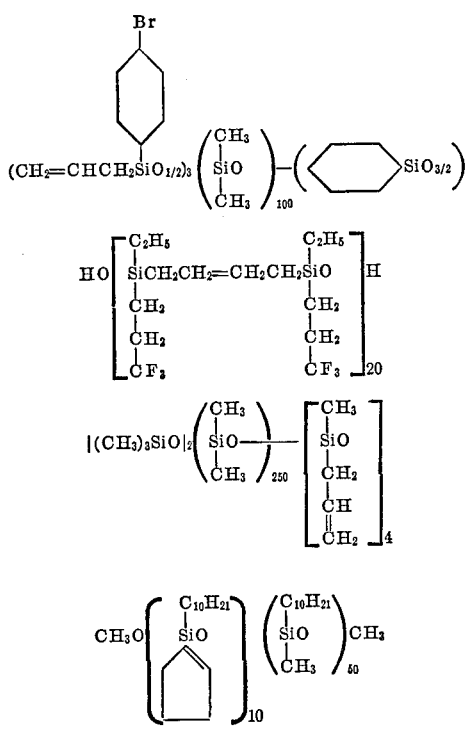

and

The organic and silicone rubbers are preferred for use in this invention.

By "essentially uncrosslinked" it is meant that the polymer molecules of (a) are soluble in compatible solvents. Materials that are crosslinked swell rather than dissolve when placed in a solvent, since the molecular weight of crosslinked materials is indefinitely high, and a given particle of the substance behaves as if it were all one molecule.

By "room temperature curable copolymer" is meant a material that becomes an insoluble, infusible solid upon exposure to the air. The rate of cure can be accelerated by heating.

To assure room temperature curability, it is preferred that (a) have an average molecular weight of over 1000, and that (a) have an average of more than two unsaturated polymer units per molecule. Also there should be more than two moles of ingredient (b) present, based on the moles of polymer molecule present, so that an average of at least 2(b) units will graft into each molecule of (a). It is also preferred for each grafted copolymer molecule to have an average of more than X units.

It is especially preferred to use higher polymers for ingredient (a); the optimum molecular weight varies with the nature of the polymer, but best results are generally achieved with the largest copolymer that has the requisite handling properties, e.g. is not so viscous in its uncured state as to give difficulty in handling.

Fillers can be added to the copolymers of this invention to improve their physical characteristics. The preferred amount of filler to be added is from 4 to 150 parts by weight of every 100 parts by weight of copolymer.

Examples of suitable fillers are carbon black, silica, titania, alumina, asbestos, glass fiber or powder, mica, feldspar, or powdered iron, aluminum, or copper.

Condensation catalysts to enhance the room temperature cure of the materials of this application can be added, if desired, preferably using no more than five parts by weight of catalyst per 100 parts of copolymer.

Desirable catalysts are primary, secondary, and tertiary amines, preferably having a dissociation constant of at least $10^{-10}$, such as sec-butylamine, hydrazine, t-octylamine, dimethylaminomethylphenol, ethylenediamine, quinine, arginine, o-methoxybenzylamine, triethylamine, aniline, and pyridine.

Also operative as catalysts are the condensation products of an aliphatic aldehyde and an aliphatic primary amine, such as the condensation products of formaldehyde and methylamine, acetaldehyde and allylamine, crotonaldehyde and ethylamine, isobutyraldehyde and ethylamine, acrolein and butylamine, alpha, beta-dimethylacrolein and amylamine, butyraldehyde and butylamine, acrolein and allylamine, and formaldehyde and heptylamine.

Another class of catalysts for the reaction is the carboxylic acid salts of metals higher than hydrogen in the electromotive force series of metals. Specific examples of the metals that can be used are lead, tin, nickel, cobalt, iron, cadmium, chromium, zinc, manganese, aluminum, magnesium, barium, strontium, calcium, cesium, rubidium, potassium, sodium and lithium. Specific examples of these salts are the naphthenates of the above metals such as lead naphthenate, cobalt naphthenate and zinc naphthenate; salts of fatty acids such as iron 2-ethylhexoate, stannous 2-ethylhexoate, potassium acetate, chromium octoate; salts of polycarboxylic acids such is dibutyl tin adipate and lead sebacate; and salts of hydroxy carboxylic acids such as dibutyl tin dilactate.

Another class of catalysts is the organic titanium compounds. These are titanium esters in which there are TiOC linkages, being derived either from an alcohol or a carboxylic acid. If derived solely from a carboxylic acid, the titanate falls into the class of catalysts described above. If derived in part of entirely from an alcohol or alcohols, the titanate is of the formula $Ti(OY)_4$, wherein Y is the residue of an alcohol molecule. The derived titanate can be from a combination of a carboxylic acid and alcohol.

Specific examples of organotitanium compounds which are operative herein include tetraethyl titanate, tetraisopropyl titanate, tetra-n-butyl titanate, tetra-2-ethylhexyl titanate, tetraphenyl titanate, tetraoctadecyl titanate, tetra-12-octadecyl titanate, triethanolamine titanate, $[(HOC_3H_6)_2N(CH_2)_3O]_2Ti[OCH(CH_3)_2]_2$
$[(CH_3CH_2)_2N(CH_2)_2O]_4Ti$
$[(C_6H_{13})_2N(CH_2)_6O]_2Ti[OCH_2CH(CH_3)_2]_2$ $[C_4H_9NH(CH_2)_4O]_4Ti$, $(HOCH_2CH_2NHCH_2O)_4Ti$, tetrakis-triethanolamine titanate-N-stearate, ethylene glycol titanate, $Ti[OCH_2CH(CH_2CH_3)CH(OH)CH_2CH_2CH_3]_4$, tetra(methylcellosolve)titanate, bis(acetylacetonyl)diisopropyl titanate,

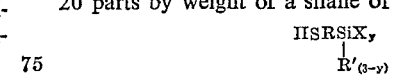

$[HOOCCH(CH_3)O]_4Ti$, $[HOOC(CH)_4O]_2Ti(OH)_2$ $(CH_3COOCH_2O)_4Ti$, and diisopropyldiacetoxy titanate.

In addition, solvent-soluble partial hydrolyzates of any of the above titanates can be employed and, in addition, part or all of the organoxy radicals can be replaced by $M_3SiO-$ radicals wherein M is a monovalent organic radical.

The above list of catalysts is only a partial list of some of the more desirable classes of catalysts, and is not meant to exclude other operative catalysts.

Condensation catalysts are generally not necessary when X is chlorine, bromine, acetoxy, or either of the isocyanoxy groups shown above. Preferred X groups are ethoxy and methoxy.

The compositions of this invention can be made by applying energy, for example, heat, electromagnetic radiation, or particulate radiation, to a composition consisting essentially of (a) 100 parts by weight of an essentially uncrosslinked organic polymer wherein at least one mol percent of the polymer units contained in the organic polymer possess aliphatic unsaturation, (b) from 0.6 to 20 parts by weight of a silane of the formula $$HSRSiX_y$$
$$R'_{(3-y)}$$

where the symbols are defined above, (c) from 0 to 150 parts by weight of a filler, (d) from 0 to 50 parts of a curing catalyst, and (e) from 0 to 10 parts of a free radical forming catalyst.

The compositions so formed cure to infusible and insoluble materials on exposure to the atmosphere, if sufficient energy has been applied. The amount of energy that is required varies according to the type of energy used and the nature and amount of the various ingredients present, but typical examples of the amounts of energy required are shown below.

It is often desirable to apply the energy to the composition before adding ingredients (c) and (d), which are the filler and the curing catalyst. The filler will shield the other ingredients from irradiation by ultra-violet light, making that method of energy application difficult to use, while the curing catalyst may participate in side reactions which can be initiated by the energy.

When energy is applied to ingredients (a) and (b), they undergo a grafting reaction, wereby the mercapto groups of ingredient (b) apparently react with the unsaturated groups of ingredient (a) to form chemical bonds between the molecules of (a) and (b).

These new molecules, when exposed to the moisture of the air, chemically crosslink with each other by hydrolysis and condensation of the SiX groups to SiOH groups and then to SiOSi groups by the following reactions:

$$\equiv SiOH + \equiv SiX \rightarrow \equiv SiOSi \equiv + HX$$
$$2 \equiv SiOH \rightarrow \equiv SiOSi \equiv + H_2O$$

This serves to cure the compositions to an insoluble, infusible composition.

When the energy is applied to the reaction mixture by means of heat, a free radical forming catalyst can be used to accelerate the grafting reaction and to lower the required temperature for the grafting reaction. Examples of such free radical forming catalysts are di-tertiarybutyl peroxide, dicumyl peroxide, t-butyl peracetate, ammonium persulfate, dibenzoyl peroxide, and N,N-azo-bisisobutyronitrile; that is to say, any peroxide, persulfate, diazo compound, etc. that dissociates into free radicals. Many are known to the art.

The temperature required to run the grafting reaction can be as low as 30° C. or below, if a free radical forming catalyst is used. The lower limit of the temperature range will be the minimum dissociation temperature of the free radical forming catalyst. Temperatures as high as 130° C. are also operative, the limiting factor being the stability of ingredients (a) at that temperature.

Other forms of energy that can be used are infrared, ultra-violet, X-ray and alpha,beta- or gamma-radiation.

It may be desirable to place ingredients (a) and (b) in a solvent, or to make an emulsion of them, before irradiating. This is especially true when ultra-violet radiation is used, since ultra-violet does not easily penetrate matter, but by stirring the solution of (a) and (b) all portions of the material will be exposed to the ultra-violet source.

The irradiated or heated compositions can then be mixed with curing catalyst and filler, if that was not done beforehand, to form compositions that cure on standing in the air to infusible materials. They are, however, stable when stored in the absence of moisture.

The compositions of this invention are useful as sealants and molding compounds. Rapid, deep-section cure, generally independent of the moisture in the atmosphere, can be attained by adding catalysts such as stannous octoate to the composition in the presence of MgO, where the X groups of the composition are lower acyloxy.

Furthermore, crosslinking agents such as ethylpolysilicate and methyltrimethoxysilane can be added to the decomposition to increase the crosslink density and the toughness of the polymer, if X is lower alkoxy.

Such techniques are substantially identical to the methods of curing one and two component silicone RTV elastomers, which are known commercial products. Other known curing methods for silicone RTV elastomers are also applicable for the materials of this application, and the presence of the additives required to accomplish these curing mechanisms are not intended to place the compositions outside of the scope of the claims of this application.

The rubbery compositions of this invention are useful as glues and cements, having the advantage over most other rubber glues of being insoluble in solvents after curing, and being resistant to "creep," which is the gradual flow under pressure that characterizes the uncrosslinked rubber cements.

The rubbery compositions of this invention can be used to adhere rubber to rubber. They are also suitable for joining any solid substrates such as metals, ceramics, glass, stone, wood, or plastics to each other or to rubber. Since the compositions cure at room temperature, no heating is required. The substrates to be adhered need only be held firmly together until the compositions of this invention have cured. They are best used with a volatile solvent, in any proportion where more than 5 weight percent of the composition of this invention is present.

The compositions are also useful as paint ingredients and coatings, being solvent-soluble before cure for ease of application, but curing to insoluble materials.

The following examples are illustrative only and should not be construed as limiting the invention which is properly delineated in the appended claims. All parts are parts by weight unless otherwise indicated.

Example 1

A 20 weight percent solution of polybutadiene of sufficient molecular weight to be vulcanizable to a rubber, dissolved in xylene, was prepared.

Three samples were prepared, each containing 17 g. of the above solution. To sample (a) was added 0.020 g. (0.6 weight percent, based on the weight of the polymer) of

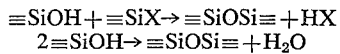

To sample (b) was added 0.041 g. (1.2 weight percent) of

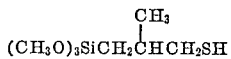

To sample (c) was added 0.0829 (2.4 weight percent) of

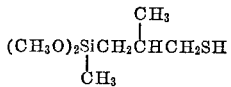

The three samples were heated for 24 hours at 100° C. to form copolymers of the ingredients. There was then added to each sample 0.163 g. of $CH_3Si(OCH_3)_3$ as a crosslinking agent and 0.082 g. of titanium acetonyl acetate, a condensation catalyst.

The products were gums that were easily workable.

Ribbons of each of the samples were allowed to stand in the air for four days. They cured to rubbery materials with the following physical characteristics:

| Elongation to break point, percent: | Tension set after stretching 300% and holding 1 minute, percent [1] |
|---|---|
| (a) 1500 | 150 |
| (b) 1100 | 80 |
| (c) 300 | 0 |

[1] Tension set is a measure of the resiliency of the rubber, which is determined by how nearly the rubber snaps back to its original length. 0 means that the rubber snaps back to its original length. 100% means that the rubber snaps back to a length that is 100% greater than its original length.

Other portions of samples (a), (b), and (c) were sealed in air-tight containers for four months. After four months they were still gums. They were then exposed to the air to give rubbers having characteristics similar to those above.

Example 2

The experiment of Example 1 was repeated, adding 0.3 g. of

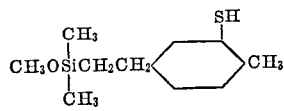

to 17 g. of the polybutadiene solution of Example 1.

octoate as a curing catalyst, and each uncured sample was then allowed to stand in the air after evaporating the solvent.

Cured rubbers which were insoluble in hot toluene resulted.

The type of rubber stock used, the solvent, the physical characteristics, the gel time following exposure to the air, and the tension set are recorded below for the samples.

The tension set test is describd in Example 1. The rubber in this case was stretched by 300 percent and held for 15 seconds. The tension set is measured 15 seconds thereafter.

TABLE

| Rubber Stock | Solvent | Durometer | Tensile (p.s.i.) | Elongation (percent) | Gel Time (min.) | Tension set (percent) |
|---|---|---|---|---|---|---|
| Polybutadiene | Heptane | 35 | 200 | 700 | 90 | 25 |
| Ethylene-propylenecyclohexadiene | do | 42 | 250 | >2,000 | 15 | 35 |
| Styrene-butadiene | do | 50 | 700 | 800 | 1 24 | 20 |
| Butadiene-acrylonitrile | Xylene | 40 | 400 | 1,200 | 1 | 35 |
| Natural | Water emulsion | | | | (²) | 20 |
| Styrene-butadiene | do | | | | (²) | 35 |
| Butadiene-acrylonitrile | do | | | | (²) | 50 |

¹ Harris.
² Independent of air.

This was heated at 100° C. for 24 hours to form a viscous copolymer of the two ingredients.

To one portion of this sample there was added a small amount of ethylpolysilicate as a crosslinking agent and stannous octoate as a curing catalyst.

To another portion of this sample there was added a small amount of dodecylbenzenesulfonic acid as a curing catalyst.

Both portions cured to rubbers when exposed to the air.

Example 3

To 5 g. of liquid styrene-butadiene copolymer there was added 0.2 g. of $$(CH_3O)_2SiCH_2CHCH_2SH$$
$$\qquad\qquad\; |\quad\;\; |$$
$$\qquad\qquad CH_3\; CH_3$$

plus 0.5 g. of benzoyl peroxide.

This was heated at 70° C. for 16 hours to give a viscous graft copolymer.

The copolymer was mixed with a small amount of ethylpolysilicate, catalyzed with stannous octoate, and exposed to the air for 38 hours to yield a rubbery material.

Example 4

100 g. samples of the following solution were prepared by mixing 10 g. of an organic rubber stock as shown below, 0.2 g. of $(CH_3O)_3SiCH_2CH_2SH$, roughly 89 g. of solvent as shown below, and a small amount of acetone as an activator for the grafting reaction.

Each of these samples were placed in a quartz flask and irradiated with a standard ultra-violet lamp for 4 minutes, with stirring. The ultra-violet lamp was 2 inches away from the flask.

To each sample there was then added 0.2 g. of ethylpolysilicate as a crosslinking agent and 0.1 g. of stannous Example 5

To 100 g. of a 10 weight percent toluene solution of styrene-butadiene rubber was added 0.2 g. of $$(CH_3O)_3SiCH_2CH_2SH$$

This was irradiated in the manner of Example 4, to yield a graft copolymer.

This material was divided into two samples. To each sample was added 0.1 g. of stannous octoate. To sample (a) there was added 0.2 g. and to sample (b) 1 g. of ethylpolysilicate.

The samples were exposed to the air to yield cured rubbers with the following properties:

| Durometer | Tensile (p.s.i.) | Elongation (Percent) | TensionSet (Percent) ¹ |
|---|---|---|---|
| 38 | 750 | 850 | 12.5 |
| 40 | 820 | 800 | 15 |

¹ Measured as in Example 4.

The excess ethylpolysilicate acts as a reinforcing filler, as can be seen by the superior tensile strength of Sample B.

Example 6

20 weight percent toluene solutions of the rubber stocks shown below were mixed with the following weight percents of

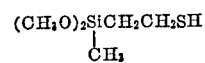

based on the weight of the rubber stock. They were placed in quartz flasks and exposed, with stirring, to the ultra-violet dosages from a standard ultra-violet lamp shown below, to yield copolymers.

To this was added a small amount of ethylpolysilicate and stannous octoate.

The evaporated compositions were insoluble rubbers after they had gelled. The gel time of the evaporated compositions following exposure to the air and the tension set (tested as in Example 4), are also shown below:

a standard ultra-violet bulb, the distance of the bulb from the flask being 2 inches.

| Rubber | Percent Silane | Nature of U.V. treatment (distance of lamp from flask and time) inches/min. | Gel Time, hr. | Tension set (percent) |
|---|---|---|---|---|
| Polybutadiene | 2 | 2/10 | 1 | 20 |
| Do | 2 | 4/15 | 1.5 | 20 |
| Do | 4 | 2/10 | 6 | 12.5 |
| Styrene-butadiene | 2 | 2/15 | 12 | 25 |
| Do | 2 | 4/30 | 20 | 50 |
| Styrene-acrylonitrile (low CN content) | 2 | 2/15 | ¹1 | 25 |
| Styrene-acrylonitrile (high CN content) | 2 | 2/15 | 1.5 | 60 |
| Ethylene-propylenecyclohexadiene (low nol wt.) | 2 | 2/15 | 7 | >100 |
| Ethylene-propylene cyclohexadiene (med. mol. wt.) | 2 | 2/15 | 12 | >100 |
| Ethylene-propylene cyclohexadiene (high mol. wt.) | 2 | 2/15 | 8 | 35 |

¹ Minute.

Example 7

When a mixture of 100 parts by weight of fluid natural latex, 20 parts by weight of

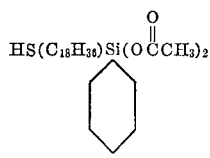

and 50 parts by weight of carbon black are exposed to 500 roetgens of radiation from a cobalt 60 source and allowed to dry, a rubbery material which is insoluble in organic solvents is formed.

Example 8

When a mixture of 100 parts by weight of butyl rubber stock which contains 2 mol percent of polymeric units that contain aliphatic unsaturation is mixed with 15 parts by weight of

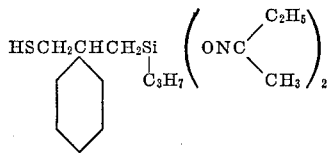

and 30 parts by weight of high surface area powdered silica, and this is exposed to 400 roentgens of X-rays, a pasty composition is formed that rapidly cures to a rubber material when contacted with air and a small amount of tetrapropyl titanate.

Example 9

(a) A commercial rubber adhesive consisting of a 20 weight percent solution of neoprene in a volatile solvent was applied by brush to a rubber strip that was affixed to a surface, and allowed to dry for 15 minutes. A second rubber strip was then placed on top of the coated strip with firm pressure, and the strips were allowed to stand overnight.

The second strip was then pulled away from the first, the direction of pull being normal to the plane of the first strip. The force required to separate the strips was 1900 g.

(b) The experiment of (a) was repeated, using a 20 percent heptane solution of polybutadiene. The force required to separate the strips was 200 g.

(c) To a 20 weight percent heptane solution of polybutadiene in a quartz flask there was added 2 weight percent, based on the weight of the polybutadiene, of $(CH_3O)_3SiCH_2CH_2SH$, 3 weight percent of methyltrimethoxysilane as a crosslinker, and 1 weight percent of titanium tetraacetonyl acetate.

This was exposed to 4 minutes of ultra-violet light from a standard ultra-violet bulb, the distance of the bulb from the flask being 2 inches.

The graft polymer solution formed thereby was brushed onto a rubber strip that was affixed to a surface, and the procedure of (a) was repeated.

The force required to separate the strips in this case was 3200 g., almost twice as great as the force needed for the commercial rubber adhesive.

Example 10

To 20 g. of a copolymer of maleic anhydride and propylene glycol dissolved in 20 g. of xylene there was added 1 g. of $(CH_3O)_3SiCH_2CH_2CH_2SH$, 1 g. of ethylpolysilicate, and 1 g. of stannous octoate.

This was allowed to stand at room temperature in the air for four days.

At the end of this period, a soft gel that was insoluble in xylene was recovered.

In this case, the heat of the room was sufficient activation energy to cause the mercaptosilane to graft to the copolymer. This grafting process took place concurrently with the crosslinking of the hydrolyzable silyl groups.

Example 11

To each of three samples of: 100 parts by weight of styrenebutadiene rubber dissolved in 400 parts of xylene, there was added 8.8 parts of

5 parts of ethylpolysilicate, and two parts of stannous octoate.

The mixture was heated for 24 hours at 100° C. There was then added to each sample that amount of a phenyl methylsiloxane resin, based on the weight of the styrene-butadiene polymer, shown below, the resin acting as a filler. The solvent was allowed to evaporate overnight by exposing the mixture to the air.

After standing in the air for two days, rubbery materials with the following physical properties were recovered. The tension set was measured as in Example 1.

| Wt. Percent Resin | Wt. Percent Polymer | Elongation Percent | Tension set Percent |
|---|---|---|---|
| 1 | 99 | 1,100 | 50 |
| 10 | 90 | 700 | 40 |
| 50 | 50 | 300 | 20 |

The material containing 50 percent resin was tough and leathery.

Example 12

Four samples, each containing 3.4 g. of a dimethylpolysiloxane gum, 4 mol percent of the siloxane units having vinyl groups, were dissolved in xylene to give 11.3 g. of solution.

To three of these samples there was added 0.34 g. of one of the following silanes. To all four samples there was added 0.1 g. each of ethylpolysilicate and stannous octoate.

The four samples were allowed to dry by evaporation of the solvent, and were then exposed to four minutes of ultra-violet light from a source that was at a distance of 2 inches.

They were then allowed to stand in the air for a day to yield elastomers with the following properties:

| Silane | Durometer (shore A) | Elongation, Percent | Tension set, Percent [1] |
|---|---|---|---|
| None | 10 | 950 | 20 |
| $(CH_3O)_3SiCH_2CH_2CH_2SH$ | 13 | 350 | 10 |
| $(CH_3O)_2SiCH_2CHCH_2SH$ <br>            $\vert$    $\vert$ <br>           $CH_3$ $CH_3$ | 11 | 450 | 10 |
|    $CH_3$ <br>     $\vert$ <br> $CH_3OSiCH_2CH_2CH_2SH$ <br>     $\vert$ <br>    $CH_3$ | 10 | 650 | 10 |

[1] Measured as in Example 1.

Example 13

To a 10 weight percent heptane solution of coumarone-indene resin (Neville R5) there was added 2 percent, based on the weight of the resin, of $$(CH_3O)_3SiCH_2CH_2SH$$

This was exposed to 4 minutes of ultra-violet light from a standard ultra-violet bulb at a distance of 2 inches.

To this was added 1 percent each of ethylpolysilicate and stannous octoate, based on the weight of the resin.

A film of solution was allowed to stand overnight. The result was a clear, glassy film that was insoluble in both acetone and heptane.

A film of a heptane solution of coumarone-indene resin having no mercaptosilane present formed a grainy surface upon standing overnight. The dry film was soluble both in acetone and in heptane.

Example 14

To a 10 weight percent xylene solution of chloroprene rubber stock (DuPont Neoprene WRT) there was added 2 percent, based on the weight of the rubber stock, of $(CH_3O)_3SiCH_2CH_2SH$.

This was exposed to 4 minutes of ultra-violet light from a standard ultra-violet bulb at a distance of 2 inches.

To this was added 1 percent each of ethylpolysilicate and stannous octoate, based on the weight of the resin.

A film of the solution was allowed to stand for 72 hours to yield a rubber that was insoluble in toluene, having a tension set (tested as in Example 4) of 40 percent.

A dried film of the above chloroprene rubber stock, prepared from a 10 weight percent xylene solution of the stock, was soluble in toluene.

Example 15

A homogenized mixture of 63.5 weight percent of water, 3.5 percent of a mixture of cyclic methylvinylsiloxanes, 31.5 percent of a mixture of cyclic dimethylsiloxanes, 0.5 percent of dodecylbenzenesulfonic acid, and 1 percent of sodium dodecylbenzene sulfonate was heated at 70 to 90° C. to yield a stable emulsion of a copolymer of methylvinylsiloxane and dimethylsiloxane, said copolymer having a viscosity of 25,000 cp. at 25° C. About 15 weight percent of unreacted cyclic siloxanes remained, based on the weight of the copolymer.

The emulsion was neutralized with sodium carbonate.

To 100 g. of the above, there was added 8 g. of $(CH_3O)_3SiCH_2CH_2CH_2SH$ with shaking. Samples of this mixture formed a gummy, uncrosslinked film when allowed to dry.

When, however, a sample of the mixture is exposed to ultra-violet light for 10 minutes and then allowed to dry to a film, a snappy rubber is formed.

That which is claimed is:
1. A room temperature curable copolymer of
    (a) 100 parts by weight of an essentially uncrosslinked organic polymer wherein at least 1 mol percent of the polymer units contained in the organic polymer possess aliphatic unsaturation, and
    (b) from 0.6 to 20 parts by weight of a silane of the formula $$\underset{R'_{(3-y)}}{HSRSiX_y}$$

where R is a divalent hydrocarbon radical free of aliphatic unsaturation, X is selected from the group consisting of hydroxyl and hydrolyzable groups, R' is a monovalent hydrocarbon radical, free of aliphatic unsaturation, of no more than 6 carbon atoms, and y has a value of 1 to 3.

2. The composition of claim 1 where at least 3 mol percent of the polymer units of (a) contain aliphatic unsaturation.

3. The composition of claim 1 where (b) is $$HSCH_2CH_2Si(OCH_3)_3$$

4. The cured composition of claim 1.

5. The composition of claim 1 where (a) is an organopolysiloxane polymer.

6. The composition of claim 1 where (a) is an unvulcanized organic rubber having at least 3 mol percent of polymer units which possess aliphatic unsaturation.

7. A room temperature curable composition consisting essentially of 100 parts by weight of the composition of claim 6, from 4 to 150 parts by weight of a filler, and from 0 to 5 parts of a curing catalyst.

8. The cured composition of claim 7.

References Cited

UNITED STATES PATENTS

| | | | |
|---|---|---|---|
| 2,812,278 | 11/1957 | Boger | 161—240 |
| 3,057,791 | 10/1962 | Anderson | 204—159.18 |
| 3,170,940 | 2/1965 | Johnston | 260—46.5 |
| 3,312,669 | 4/1967 | Giordano | 260—448.2 |

SAMUEL H. BLECH, *Primary Examiner.*

W. J. BRIGGS, SR., *Assistant Examiner.*

U.S. Cl. X.R.

161—193, 206, 207, 208; 204—159.13; 260—3, 40, 41.5, 46.5, 79.5, 448.2, 448.8, 827